June 3, 1941.    E. A. HOBART    2,244,063
TRACTOR WELDER
Filed Jan. 9, 1939    3 Sheets-Sheet 3

INVENTOR
EDWARD A. HOBART.
BY
ATTORNEYS

Patented June 3, 1941

2,244,063

UNITED STATES PATENT OFFICE 2,244,063

TRACTOR WELDER

Edward A. Hobart, Troy, Ohio, assignor to The Hobart Bros. Company, Troy, Ohio, a corporation of Ohio Application January 9, 1939, Serial No. 249,840

4 Claims. (Cl. 180—53)

The present invention relates to electric welders and more particularly to those of the portable type.

In the art of welding by use of a portable machine, it has been customary to provide a motor generator set mounted on a chassis and moved to the scene of operations by automobile or truck. If the job was small, the traction vehicle would remain hitched to the welder. When electric current was not available at the work, a gas engine was generally substituted for the motor. But the outfit was still pulled from job to job by a suitable vehicle. Obviously, an arrangement of this sort is expensive, because the vehicle would remain idle, or subject to call while the welder was at work.

As far as I am aware, it has never occurred to those skilled in the art to utilize the gas engine which drives the generator for furnishing the traction. It will be understood that the load on the gas engine is subject to considerable and abrupt variation, depending on the welding current. The current may be as low as 10 amperes and again may run as high as 500 amperes. The gasoline engine should, therefore, be of a fairly low power so as to operate efficiently during the low current conditions and yet have sufficient power to meet the high current demands. When it is considered that the voltage drop across the arc is fairly low, the power required of the generator and, therefore, of the engine is not considerable even though the current demand is high. It was, therefore, not to be expected that an engine efficiently designed to carry a load of this unusual character could also be efficiently employed for traction, particularly when the weight of the tractor is not inconsiderable. It might also have been expected that, while the engine was being used purely for traction purposes, the welding and exciting generators, unless mechanically disconnected, might impose a load which would materially reduce the traction effort.

However, I have found, after intensive study and development, and particularly in providing a more direct drive for the generator and tractor, that it is entirely feasible to employ the same engine that drives the generator to produce the traction effort. As will be explained later in the specification, the armature circuit of the exciting generator and the field circuit of the welding generator are automatically opened, while the machine is in transit so that these generators impose practically no electrical load on the engine during this time. In view of all of the considerations above noted, and in accordance with the present invention, I propose to employ the engine for moving the machine from job to job and also for rotating the electrical generators.

Accordingly, the primary object of the present invention is to provide an engine-propelled welding outfit.

Other objects are: to provide a welder built into a tractor; to provide a portable welder which is mounted on an engine-propelled chassis and is mechanically powered by the engine; to provide a portable welding tractor driven by an electric motor which receives its energy from the welding generator mounted on the tractor; to provide a portable welding machine including an engine-driven generator, in which the engine can be additionally employed as a traction drive for the machine; to provide an engine-propelled welding outfit, in which the welding generator and the exciting generator are both mounted on the crank shaft of the engine in order to simplify the mechanical parts of the machine; and, in general, to provide a self-propelling completely contained welding machine, in which the same prime mover serves to propel the machine and to rotate the welding generator.

Other objects and features will be apparent as the specification is perused in connection with the accompanying drawings, in which—

Figure 4 is a diagrammatic view of the gasoline engine, its crankshaft, the welding and exciter generators, together with a control instrument board including an open-circuiting switch connected between the generators.

Figure 1:
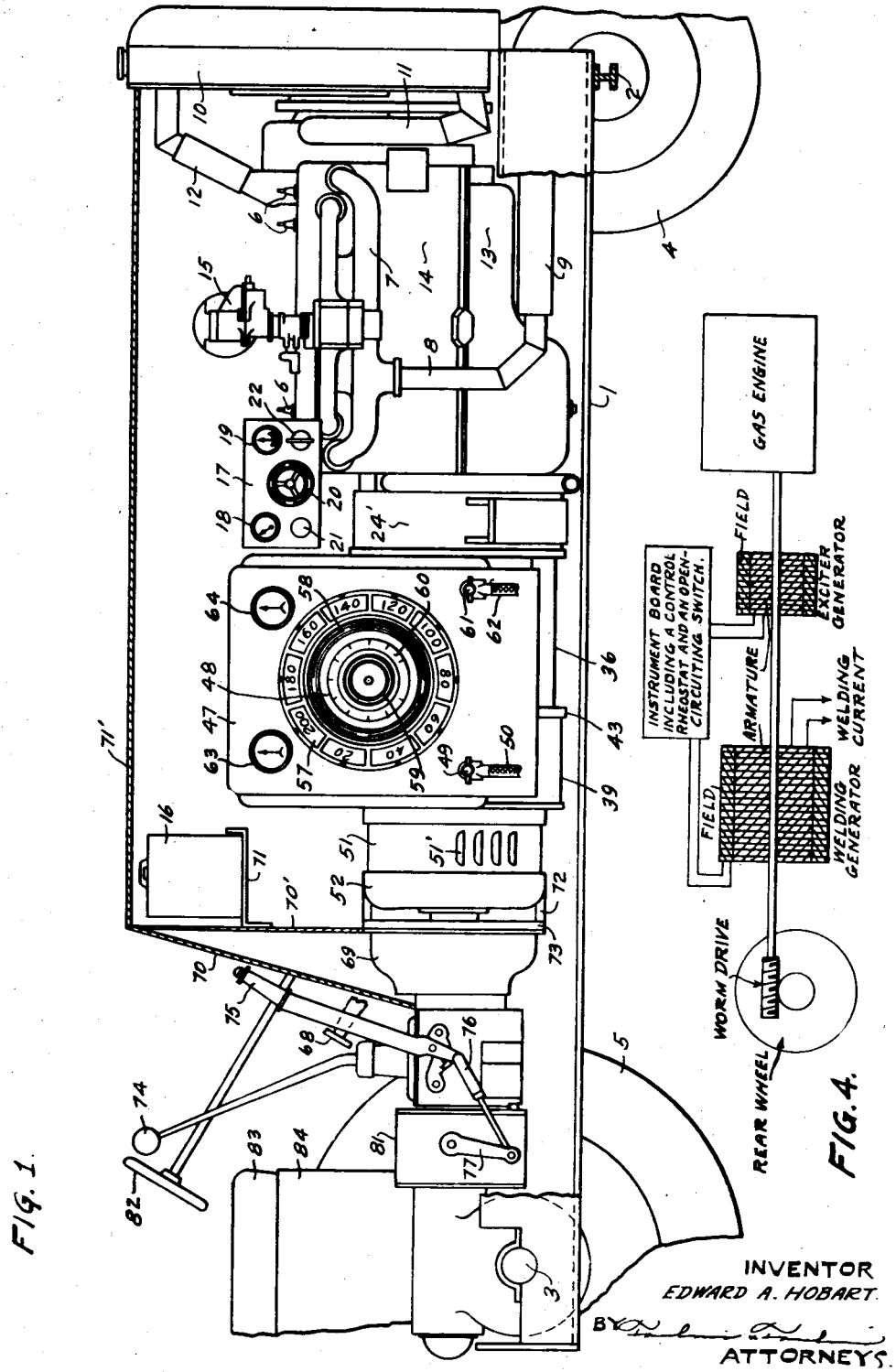
Figure 1 is an elevational view of the improved tractor-welder driven by a gasoline engine. The hood over the engine is shown in cross section and the front and rear ends of the welder are broken away.
Figure 2:
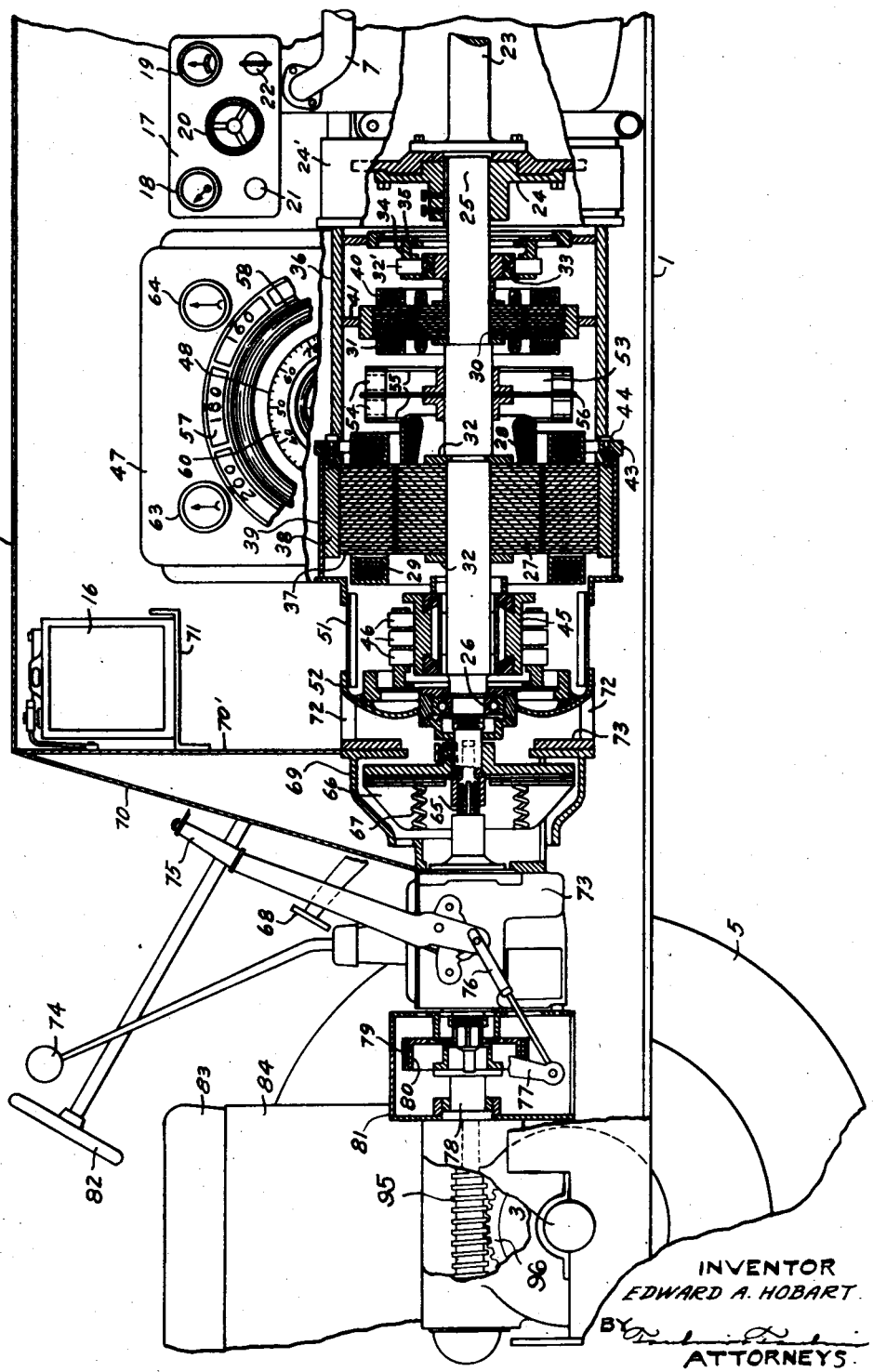
Figure 2 is a view, partly sectional and partly in elevation, taken along the main axis of the welder illustrated in Figure 1 to show particularly the relation between the engine crank shaft and the welding and exciting generators.

The frame of the entire machine, which is about to be described, is constituted of a pair of oppositely positioned longitudinally extending channel members 1 which are secured as by welding to a pair of shorter, transversely extending channel members (not shown). The frame carries at each end suitable bearings, in which the steering axle 2 at the front end and the driving axle 3 at the rear are mounted. These axles are provided respectively with wheels 4, 5 which preferably are pneumatically tired. As can be seen from the drawings, the frame 1 carries a gasoline engine and a pair of generators, together with necessary transmission for gearing the rear axle to the engine.

A few of the main parts of the engine will be specifically identified, but it will be understood that the engine itself does not constitute a part of the present invention, except insofar as it cooperates with the remaining parts of the machine to constitute a self-contained welder of the tractor type. The engine is illustrated as being of the four-cylinder type, of which three of the spark plugs 6 are shown. The exhaust manifold system is indicated at 7 passing through an exhaust main 8 into a muffler 9. The cooling system is illustrated by the radiator 10, the water inlet 11 and the water outlet 12. A crank case 13 is secured to the bottom of the engine block 14. A combined carburetor and air filter is indicated at 15.

The engine is provided with a generator (not shown) for charging the storage battery 16 and is also provided with a self-starter motor (not shown). The control instruments are carried on a panel 17 and consist of the usual ammeter 18 for indicating charging rate, the usual oil gauge 19 and a device illustrated as a hand wheel 20 for changing the rate of gasoline flow to the carburetor 15 and thereby controlling the speed of the engine. The panel may also contain a self-starter button 21 and an ignition key switch 22.

The power of the engine is transmitted to a crank shaft 23, which is journaled at the radiator end in a ball bearing, not shown, and at the other end is connected through a universal joint 24 to a generator shaft 25. The joint 24 is preferably surrounded by a metal casing 24' for protection against dirt and to prevent oil splash. The shaft 25 is adapted to rotate in a ball bearing 26 positioned at the end of the shaft opposite from the universal joint.

The shaft 25 carries the armature 27 of a relatively large welding generator, windings of which are clearly seen at 28. This armature is adapted to revolve within a multi-pole field winding, indicated at 29. There is also an exciting generator secured to the shaft 25 which consists of an armature 30 adapted to rotate within a multipole field which includes the windings 31. The armatures 27 and 30 may be secured to the shaft in any suitable manner, for example, by keys (not shown) and the retaining rings indicated at 32. Suitable connections are taken from the stationary field winding 29 of the welding generator and the rotating armature 30 of the exciting generator through the brushes 32' which bear against the commutator 33. The latter is secured to the shaft 25 in any suitable manner. The brushes are mounted in a holder 34 which is adapted to be rotated to their non-sparking position on a plate 35. The latter forms part of the end wall of a cylinder 36.

The field poles 37 of the welding generator are secured in any suitable manner to an annular cast iron frame 38 which, in turn, is secured to a cylindrical metal casing 39. The field poles 40 of the exciting generator are secured through an annular web 41 to the cylindrical casing 36. The casings 39 and 36, also the generator frame 38, are all secured together through the ring 43 and the bolts 44.

The current from the armature 27 of the welding generator is carried through a commutator 45 of suitable and well-known type and secured to the shaft 25 in any appropriate manner to the brushes 46. The brushes 46 are connected in parallel and current is taken therefrom through a conductor (not shown) to the under side of a panel 47 of a current-limiting device 48 and thence to a terminal 49. Welding current is taken from the terminal through the conductor 50 to the welding electrode (not shown). The current-limiting device 48 is shown purely in diagrammatic form, since it constitutes no part of the present invention, but a general description thereof will be given presently.

The commutator 45 and brushes 46 are surrounded by a thin cylindrical casing 51 which is provided with an end shield 52. The latter is supported from the shaft by the ball bearing 26 referred to hereinbefore.

In addition to the two armatures 27, 30, the shaft 25 also supports a fan 53 which consists of a number of radially extending vanes 54 supported between a pair of end plates 55 and an intermediate plate 56. The fan serves to cool the inter-generator space, the cooling air being obtained in any suitable manner through the casing 38 and also through the louvres 51' in the casing 51.

The current from the welding generator is controlled by a dual-adjusting device 48 which provides coarse and fine adjustments of the field current which is provided by the exciting generator. The coarse adjustment is indicated as a circular path or scale 57 of figures, which may run, for example, from 0 up to 200 amperes, in increments of 20 amperes of welding current, as shown in Figure 1. There is a circular hand wheel 58, which carries a rotatable index finger (not shown) to indicate the amount of current which can be drawn through the generator under each setting of the index. For a finer adjustment of the current output of the welding generator, there may be provided another scale of current values concentric with the outer scale and operable by a smaller hand wheel 59. This inner scale may be marked off from 0 to 100 units, as indicated at 60, which in effect divides the rough increments of current values shown on the outer scale 57 into a hundred parts.

The movement of the hand wheels 58, 59 and, therefore, the adjustments of the corresponding indexes serve to change the amount of armature current obtainable from the exciting generator 30 and applied to the field winding 37 of the welding generator. The arrangement is such that the various turns of the armature winding of the exciting generator can be entirely disconnected or connected in series or in parallel and suitable resistances inserted therein (see Figure 4). Thus, the inducing effect of the current of these windings, either added or subtracted to change the magnetic excitation of the welding generator, is determined by the control settings of the device 48.

In addition to the terminal 49, the panel is also provided with a terminal 61 which will be grounded and from which a conductor 62 is taken to the work piece. The panel also carries an ammeter 63 which may be connected in any suitable manner within the welding circuit to indicate the amount of welding current flowing and also the direction of flow. A voltmeter 64 may also be provided to indicate the voltage of the welding current. The panel 47 may be supported from the casings 36, 38 in any suitable manner, and one practical way would be to form the panel as one side of a rectangular compartment which fits over these casings and still leaves room for the various electrical connectors and resistors to effect the necessary current adjustment.

The shaft 25 is extended through a splined portion 65 which supports a clutch 66 of any standard and suitable type. The clutch has been exemplified as being of the dry type, the disks of which are compressed by the springs 67. Under these conditions, the rotating effect of the shaft 25 is carried through the remainder of the driving mechanism which will be described presently. The clutch may be temporarily disengaged by means of a foot-operated pedal 68, similarly to an automobile or truck. This clutch pedal extends through an opening in an inclined wall or partition 70 which is joined to the top of a vertical partition 70' and, at the bottom, terminates near the gear box 73.

The operation of the clutch, as described, is well known in the art and needs no further explanation. The clutch is preferably surrounded by a casing 69 which is bolted or otherwise secured to the partition 70' which forms part of the chassis body. The latter may also support the storage battery 16 by means of the hangers 71. The end shield 52 has a number of longitudinally extending webs 72 which terminate in a plate 73, and is also secured to the partition 70'. The partition 70' may support one end of a rectangular hood or canopy 71' which extends over the generators, the panel board 47 and the engine to protect this apparatus from inclement weather. The opposite end of the hood may be supported on the radiator.

From the clutch 66, the shaft 65 passes into the gear box 73 which contains the usual combination of shift gears, including a neutral position, which can be controlled by the shifting lever 74 of standard form. The casing for the gear box 73 may provide a pivot support for a hand brake lever 75 which operates through a connecting rod 76 and the arm 77 to apply a braking force to the shaft 78 which passes to the rear from the gear box. The details of the brake are not important and form no part of the present invention. It is sufficient to point out that the operation of the arm 77 serves to tighten a brake strip 79 and its lining against brake drum 80 which revolves with the shaft 78. The entire brake mechanism, except for the various levers, is enclosed within a rectangular casing 81. Thus, by pulling on the hand lever 75, it is possible to apply a peripherally restraining force to the rotating drum 80 and thereby reduce the speed of rotation of the shaft 78. The latter is connected, preferably through a worm gear 95 which meshes with a ring gear 96 secured to the rear axle 3. A drive of this character can be designed in a well-known manner to accommodate the differential effects introduced by the machine traveling around corners.

For steering the machine, there may be provided suitable connecting rods and links actuated through a steering wheel 82 which projects through an opening in the partition 70. A seat 83 and its support 84 may be provided directly over the rear axle. The driver operates the mechanical part of the machine very similarly to an automobile and by means of the gear shifting mechanism can cause power to be transmitted at variable speeds from the combined engine-generator shaft 25, through the worm gear, to the rear axle.

The main difference between the operation of the improved welding machine and an ordinary automobile or truck is that the gasoline engine is started by pressing down the button 21 on the panel board 17, and the speed of the engine is controlled from the same panel rather than by a gas lever on the steering wheel. The storage battery charging rate and oil pressure are also observed from the panel board 17 instead of the dash.

When a call for a welder comes in, it is only necessary to start up the same engine which provides motive power for the welding generator and transport the self-contained machine to the scene of operations. It is no longer necessary to provide an additional vehicle for this purpose. Thus, the engine is being continually used from the time it leaves on the journey until it returns, resulting in considerable efficiency of operation. It has been found that a gas engine which is sufficiently small to efficiently carry the welding load is still of sufficient power to give a traction velocity comparable to that of a truck or automobile going at moderate speed. Thus, no time is lost in moving the welder from job to job.

It should also be noted that the rotation of the welding and exciting generators does not impose an electrical load on the engine, because the field circuit of the welding generator and the armature circuit of the exciter are broken during transportation at the current-limiting device 48.

Figure 3:
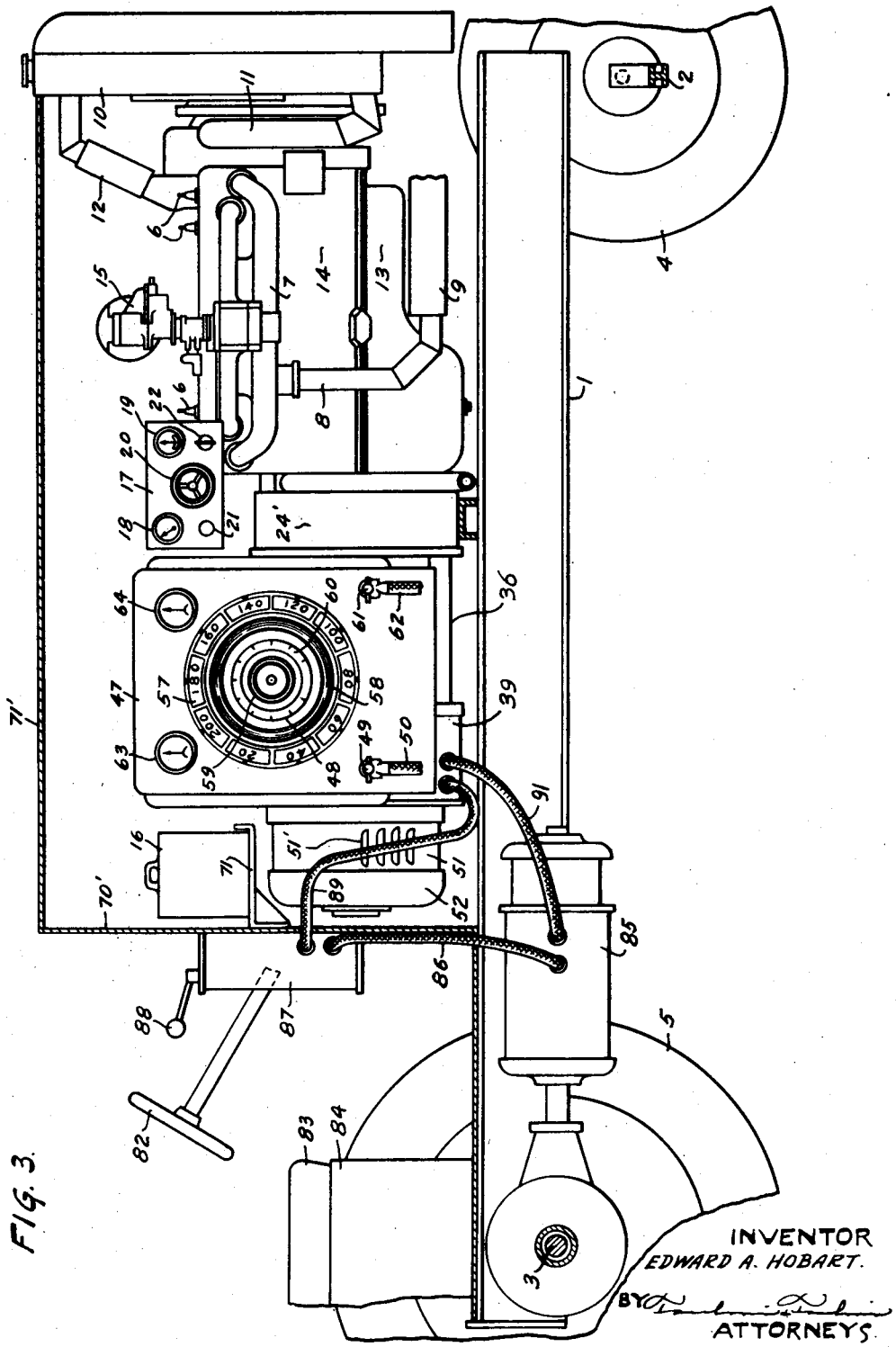
Figure 3 illustrates a modified form of traction drive in which an electric motor is employed.

Instead of providing traction by a mechanical connection through the worm gear to the engine crank shaft, I may employ an electric drive. Thus, in Figure 3, there is shown a motor 85 mechanically connected through a suitable differential to the rear axle 3. Current for this motor is taken through a conductor 86 to a controller 87 operated by a handle 88 and secured to the partition 70'. From the controller, the current passes through a conductor 89 to the brushes 46 of the welding generator and from there back to the motor through conductor 91.

As in the case previously described, the gasoline engine is first started from the panel 17 and current is taken directly from the welding generator to the driving motor 85 and the speed of the vehicle is controlled by the position of the handle 88. Inasmuch as the welding generator is called upon to carry a heavy traction load, the size of the generator may be increased somewhat, also the exciting generator which must provide additional excitation for the welding generator.

From the foregoing, it is evident that I have devised a very simple form of welding tractor and, whether the tractor drive is mechanical or electrical, the generators are mechanically well arranged with respect to the engine crank shaft. If the universal joint 24 is neglected, it will be noted that the generators are mounted directly on the crank shaft or at least a continuation of the same, which results in a very simple and highly practical arrangement. During the time that the tractor is moving from job to job and, therefore, no welding current is drawn, the armatures of the welding and exciting generators are being rotated to provide a favorable fly-wheel effect for the engine.

It will be understood that I desire to comprehend within my invention such modifications as come within the scope of the claims and the invention.

Having thus fully described my invention, what I claim as new and desire to secure by Letters Patent is:

1. A portable welding outfit comprising a chassis on wheels, a gas engine, a crank shaft connected to said engine and to said wheels, a welding generator and an exciting generator mounted on said crank shaft and interposed between said engine and said wheels, a clutch positioned between said generators and said wheels for disconnecting the wheels from the crank shaft when the generators are being used, and means for effectively disconnecting the welding generator from the shaft when the engine is being used for traction, said means including an open-circuiting switch between the field of the welding generator and the armature of the exciting generator.

2. A portable welding outfit comprising a chassis on wheels, a gas engine, a crank shaft connected to said engine and to said wheels, a welding generator, an exciting generator mounted about said crank shaft, and means for interrupting the current supplied by the exciting generator to said welding generator when power is being transmitted to said wheels, whereby the armatures of the exciting and welding generators exert solely a mechanical load on the engine.

3. A portable welding outfit comprising a chassis on wheels, said wheels being connected to a worm drive, a gas engine, a crank shaft connected to said engine and to said worm drive, a welding generator armature, an exciting generator armature mounted about said crank shaft, the fields of said generators being mounted about their respective armatures, and means for interrupting the field current delivered by the exciting generator to the welding generator when mechanical power is being transmitted to said wheels, said means also serving to restore said field current when the mechanical power is disconnected from said wheels.

4. A portable welding outfit comprising a chassis on wheels, a gas engine geared through a crank shaft to said wheels, a welding generator and an exciting generator mounted in tandem relation about said crank shaft, the fields of said generators being mounted about their respective armatures, and means optionally operable for interrupting the field current delivered by the exciting generator to the welding generator.

EDWARD A. HOBART.